(12) United States Patent
Reynes et al.

(10) Patent No.: US 11,841,093 B2
(45) Date of Patent: Dec. 12, 2023

(54) FLOW RATE REGULATING FLUIDIC CONNECTOR BETWEEN TWO DUCTS

(71) Applicant: Airbus Operations (S.A.S.), Toulouse (FR)

(72) Inventors: Didier Reynes, Toulouse (FR); Frédéric Goupil, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 17/730,746

(22) Filed: Apr. 27, 2022

(65) Prior Publication Data

US 2022/0349504 A1 Nov. 3, 2022

(30) Foreign Application Priority Data

Apr. 28, 2021 (FR) ...................................... 2104391

(51) Int. Cl.
| | |
|---|---|
| *F16K 7/06* | (2006.01) |
| *F16L 21/00* | (2006.01) |
| *F16L 55/027* | (2006.01) |

(52) U.S. Cl.
CPC .............. *F16K 7/06* (2013.01); *F16L 21/005* (2013.01); *F16L 55/027* (2013.01); *F16K 7/061* (2013.01)

(58) Field of Classification Search
CPC ..... F16K 7/00; F16K 7/02; F16K 7/04; F16K 7/045; F16K 7/06; F16K 7/061; F16K 7/063; F16K 7/065; F16K 7/20; F16K 21/005; F16L 33/08; F16L 55/027; F16L 21/005; B64D 13/00; Y10T 24/1457; B60H 1/00564; B60H 1/3435; B60H 1/3442; F24F 13/10

USPC ................... 251/4, 5, 9; 138/45, 46
See application file for complete search history.

(56) References Cited

U.S. PATENT DOCUMENTS

| | | | | |
|---|---|---|---|---|
| 820,216 | A | * | 5/1906 | Leffingwell et al. ........................ A61M 39/284 251/10 |
| 1,024,876 | A | * | 4/1912 | Barbour .................. F16K 7/061 251/8 |
| 2,195,993 | A | * | 4/1940 | Morrill ..................... F16D 3/74 464/80 |
| 2,212,733 | A | | 8/1940 | Grigsby |
| | | | | (Continued) |

FOREIGN PATENT DOCUMENTS

| | | | | |
|---|---|---|---|---|
| EP | 2752624 A1 | * | 7/2014 | ........... B60H 1/3428 |
| FR | 1321347 A | | 3/1963 | |
| | (Continued) | | | |

OTHER PUBLICATIONS

French Search Report for Application No. 2104391 dated Dec. 8, 2021.

(Continued)

*Primary Examiner* — Kevin F Murphy
*Assistant Examiner* — Jonathan J Waddy
(74) *Attorney, Agent, or Firm* — KDW Firm PLLC

(57) ABSTRACT

A fluidic connector to connect two ducts of a system such as an air conditioning system. The connector includes at least one elastic material, and includes a duct surrounded by an adjustable clamping collar which, when tightened, serves to deform it to reduce the internal space of the duct. The clamping of the collar makes it possible to easily and quickly regulate the rate of flow in the ducts.

9 Claims, 3 Drawing Sheets

(56) References Cited

U.S. PATENT DOCUMENTS

| | | | | |
|---|---|---|---|---|
| 2,792,942 | A * | 5/1957 | Feuillet | B01D 35/04 210/418 |
| 3,120,230 | A * | 2/1964 | Skold | A61B 17/122 123/634 |
| 3,162,921 | A * | 12/1964 | Cheris | F16L 33/08 24/274 R |
| 3,166,819 | A * | 1/1965 | Robbins | A61M 25/02 285/244 |
| 3,177,710 | A * | 4/1965 | Faure-Herman | G01F 1/125 73/861.83 |
| 3,204,919 | A * | 9/1965 | Tripoli et al. | F16K 7/06 251/8 |
| 3,254,869 | A * | 6/1966 | Easey | A61M 39/28 239/455 |
| 3,508,587 | A * | 4/1970 | Mauch | F16L 11/121 251/4 |
| 3,556,157 | A * | 1/1971 | Eckerlin | F16L 55/02763 251/8 |
| 3,584,830 | A * | 6/1971 | Koehn | A61M 39/283 24/135 R |
| 3,613,661 | A * | 10/1971 | Shah | A61F 6/22 606/221 |
| 3,982,722 | A * | 9/1976 | Bernard | F16K 31/06 251/129.1 |
| 4,018,060 | A * | 4/1977 | Kinsell | B64D 13/06 62/96 |
| 4,293,031 | A * | 10/1981 | Babish | F28G 9/00 165/95 |
| 5,395,349 | A * | 3/1995 | Quiachon | A61M 39/0613 604/167.03 |
| 5,873,813 | A * | 2/1999 | Weiss | A61F 5/41 600/38 |
| 7,255,322 | B1 * | 8/2007 | Tiwet | F16K 7/06 251/7 |
| 8,585,006 | B2 * | 11/2013 | Gabelgaard | F16K 7/06 251/5 |
| 11,427,891 | B2 * | 8/2022 | Lawrence | C22C 9/04 |
| 11,519,435 | B2 * | 12/2022 | Kuppan | F16K 31/002 |
| 2003/0116731 | A1 * | 6/2003 | Hartley | F16K 7/06 251/297 |
| 2005/0092944 | A1 * | 5/2005 | Patterson | F16K 7/08 251/4 |
| 2014/0254090 | A1 * | 9/2014 | Gardner | F24F 11/74 165/96 |
| 2016/0333692 | A1 * | 11/2016 | Gilbertson | F24F 13/08 |
| 2018/0363817 | A1 * | 12/2018 | Massali | F16L 27/103 |
| 2020/0370663 | A1 * | 11/2020 | Regen | F16K 27/02 |

FOREIGN PATENT DOCUMENTS

| | | | |
|---|---|---|---|
| JP | H 0363452 A | 3/1991 | |
| WO | WO 2015/103675 A1 | 7/2015 | |
| WO | WO-2016051418 A1 * | 4/2016 | ......... B60H 1/00564 |
| WO | WO 2017/003937 A1 | 1/2017 | |

OTHER PUBLICATIONS

European Office Action for Application No. 22169144 dated Sep. 22, 2022.

* cited by examiner

FLOW RATE REGULATING FLUIDIC CONNECTOR BETWEEN TWO DUCTS

CROSS-REFERENCE TO RELATED APPLICATION

This application claims priority to French patent application number 2104391 filed on Apr. 28, 2021, the entire disclosure of which is incorporated by reference herein.

TECHNICAL FIELD

The disclosure herein relates to flow rate regulation systems that serve to regulate a flow in fluid ducts of a system such as an air conditioning system.

BACKGROUND

In an aircraft, numerous pipes carry fluids of which the flow rate must be regulated. Thus, for example, the aircraft is equipped with an air conditioning system. The air flows in the pipes to supply the cabin or the cockpit. The distribution of the flow rate of certain pipes must be adapted depending on the cabin configuration of the aircraft chosen by an airline. The pipes are then provided with devices for changing the flow rate. In general, these are attached to the inside of the pipes and, when it is necessary to change the flow rate, the pipe must be removed in order to change the regulating device.

SUMMARY

The disclosure herein aims to propose a fluidic connector making it possible to regulate the flow rate and to change the regulation without it being necessary to remove or change the pipes.

To that end, the disclosure herein relates to a fluidic connector to connect two ducts, wherein it includes at least one elastic material and comprises a multi-lobed duct surrounded by an adjustable clamping collar which, when tightened, serves to deform it so as to reduce the internal space of the duct and to change the rate of flow in the connector when it is joined to the ducts.

The clamping of the collar makes it possible to easily and quickly regulate the rate of flow in the ducts.

The disclosure herein provides at least one of the following optional features, taken individually or in combination.

The connector is made of elastomer.

The collar comprises markings that serve for estimating the degree of clamping.

The markings comprise visible lines on the band of the collar.

The connector comprises two shoulder-forming projections that project outwards therefrom on either side of the duct.

The projections are formed by a widening then a reduction of the perimeter of the duct forming the connector.

Between the projections, the duct is in the shape of a multi-lobed ring.

The projections form a bellows to facilitate the radial constriction of the interposed portion of the duct.

The disclosure herein also relates to a fluidic assembly comprising two ducts and a connector according to one or more of the above features, wherein each end of the connector is connected to one of the ends of each of the ducts, the clamping of the collar making it possible to regulate the rate of flow in the ducts.

The disclosure herein also relates to an air conditioning system comprising a fluidic assembly of that kind.

The disclosure herein also relates to an aircraft provided with an air conditioning system of that kind.

BRIEF DESCRIPTION OF THE DRAWINGS

Other objects, features and advantages will become apparent from the following description of the disclosure herein, which description is given solely by way of non-limiting example, with reference to the accompanying drawings in which.

DETAILED DESCRIPTION

Figure 1:
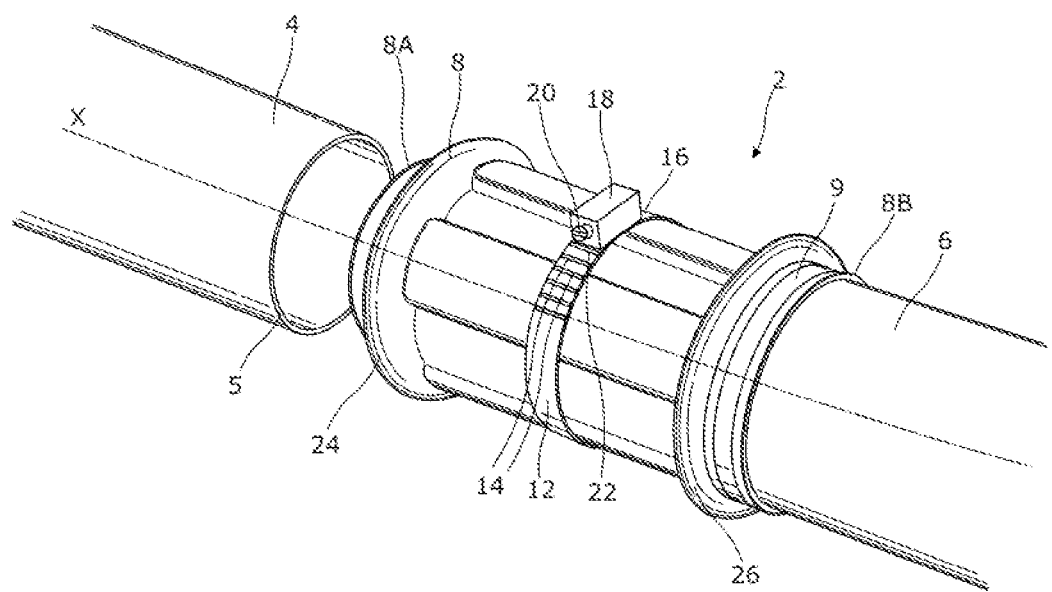
FIG. 1 is a perspective view of a fluidic assembly comprising a connector and two ducts according to the disclosure herein.

The disclosure herein relates to a fluidic assembly 2, shown in FIG. 1, comprising two ducts 4, 6 that are connected to one another by a fluidic connector 8. The fluidic assembly 2 forms part of a larger system in which a fluid flows, and of which the flow rate needs to be adjusted. By way of example, the air conditioning system of an aircraft, as mentioned previously, requires a large number of pipes in order to circulate the air in the cabin or the cockpit, these pipes being provided with regulating devices. Each end 8A, 8B of the fluidic connector 8 is attached to a free end 5 (the other end is not shown since it is covered by the connector) of the duct, 4, 6 respectively, by any known approach and for example using a clamping collar, by screwing, by welding, by adhesive bonding or any other method. In the embodiment shown, the ducts 4, 6 and the fluidic connector 8 have the same cross-sectional shape at the point where they connect, with slightly different diameters to permit assembly, so that one can be inserted inside the other: the ends of the ducts 4 and 6 are inserted inside the duct 9 and are fastened to the connector using a clamping collar (not shown). In the embodiment shown in FIGS. 1 through 4, the fluidic connector 8 takes the form of a cylindrical duct 9 like the ducts 4 and 6, but any other more complex shape is possible; the ducts 4, 6 and the fluidic connector 8 have a circular cross section, but any other cross-sectional shape is possible, for example elliptical or ovoid. The longitudinal direction is the direction of the central axis X of the duct forming the connector 8, or at least at its ends 8A and 8B. A transverse plane is a plane perpendicular to this axis.

The fluidic connector 8 is elastic: it is made of at least one elastic material. The duct 9 of the connector is encircled and surrounded by an adjustable clamping collar 12 which, when tightened (as shown by the arrows in FIG. 3), serves to deform it so as to reduce the internal space of the duct (or more specifically the volume thereof) and in so doing reduce the fluid passage aperture. The clamping collar 12 is a component that differs from the fastener, specifically in the depicted example of clamping collars used to fasten the connector to the ducts; it can have the same shape as the fastener, specifically in the form of a clamping collar. On at least part—or even all—of the duct 9, following clamping, the cross section of the duct (or more specifically the area thereof) in a transverse plane is reduced. In FIG. 3, the diameter of the collar is smaller than in FIG. 2, and the internal area of any cross section of the deformed duct of the connector in a transverse plane is reduced. This makes it possible to change the rate of flow in the duct 8, and hence in the ducts 4, 6 joined to the connector. The material is chosen to be elastic so as to return to its initial shape when the collar 12 is loosened. In the embodiment shown, the collar 12 is installed in a central position of the connector, specifically in this case equidistant from the ends 8A and 8B. The connector is made of one or more elastic materials. In one possible embodiment, the connector is made of a single material: the elastomer.

As shown in FIGS. 1 through 4, the collar 12 comprises marking signs 14 that serve to define the reduction in the passage cross section, and to serve as an indicator. In the embodiment shown, the collar is in the form of a band 16, for example a rectangular plastic band, the ends of which are connected by a clamping device 18 of the type having a rack, or another type. In the embodiment shown, this is a clamping device 18 of the Serflex™ type, having a screw 20. Turning the screw 20 causes the clamping device to tighten the collar. The collar 12 is self-locking, meaning that the collar remains locked in position (or in a close position depending on the mechanism used in the pumping device) when the screw 20 is no longer actuated. In the embodiment shown, the marking takes the form of visible lines 22. The lines 22 are mutually parallel and transverse with respect to the longitudinal direction of the band. In the embodiment shown, the color of these lines contrasts with that of the band. In the embodiment shown, the chosen color contrasts strongly with the grey color of the band, specifically for example red in order to make the lines easier to see. The lines 22 are evenly distributed, in other words they are equidistant from one another, but in another embodiment this might not be the case. They make it possible to assess the current state of clamping, depending on the remaining number of visible lines. Other types of marking may be used, either instead of the lines or in addition thereto, such as raised shapes.

The connector 8 comprises two projections 24, 26 that stand proud of the outer surface of the connector and extend outward therefrom, over its entire transverse periphery or at least part thereof, on either side of a space around which the collar 12 is installed: the projections 24, 26 form a shoulder for the collar 12. These may be continuous or discontinuous. Thus, these projections 24, 26 hold the collar in place in the longitudinal direction of the connector. They prevent the collar 12 from moving longitudinally by enclosing it on either side. When the collar 12 is in place, the projections 24, 26 may be arranged at a distance therefrom, as shown in the figures, and not adjoin it; in the embodiment shown, they are closer to the ends 8A, 8B than to the collar 12, but any other configuration is possible, such as being equidistant or closer to the collar 12 than to the ends 8A, 8B. In the embodiment shown, the projections 24, 26 are formed by a progressive widening then reduction of the perimeter of the duct of the connector 8, meaning that each projection has a semi-annular shape forming a bellows; the curves formed in section by a central longitudinal plane of the connector, respectively by the widening and the reduction of the perimeter of the connector, are symmetric with respect to the transverse plane crossing the connector at the largest perimeter of the projection. The projections 24 and 26 are identical in shape. The projections also serve to facilitate the radial constriction of the interposed portion of the duct 9: when the collar 12 is tightened, the projections, by deforming, avoid the skin of the envelope of the connector being subjected to excessive tension.

Figure 2:
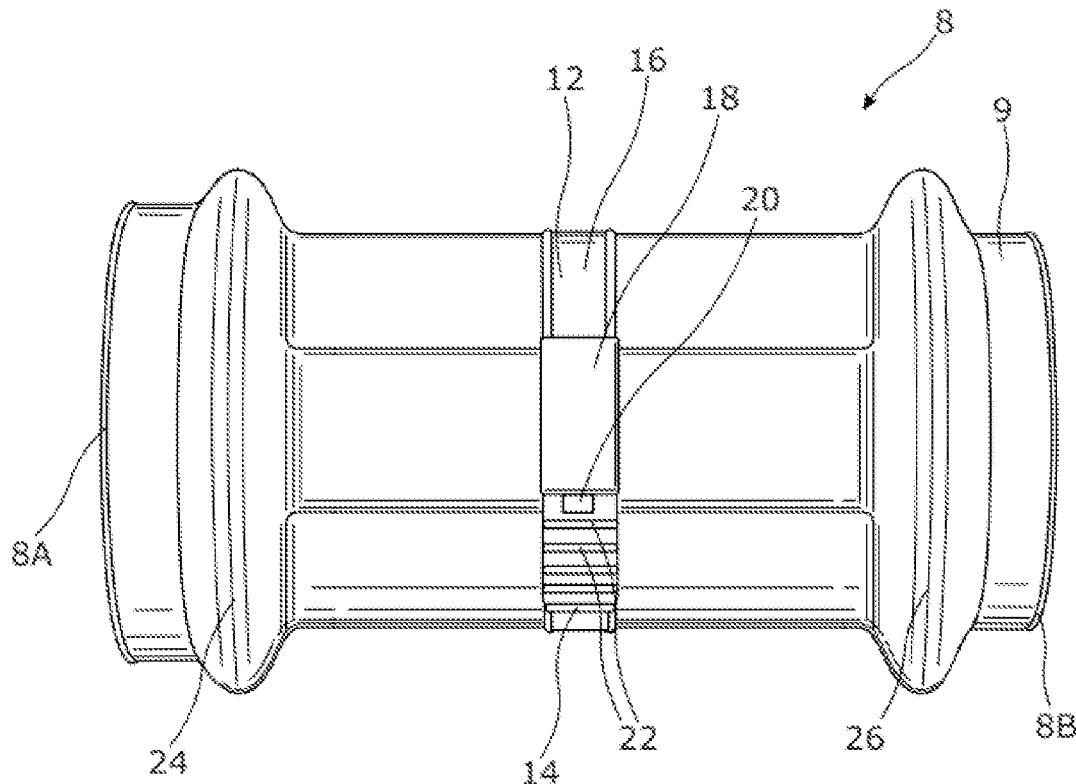
FIG. 2 is a perspective side view of the connector from FIG. 1, in the non-deformed state.
Figure 3:
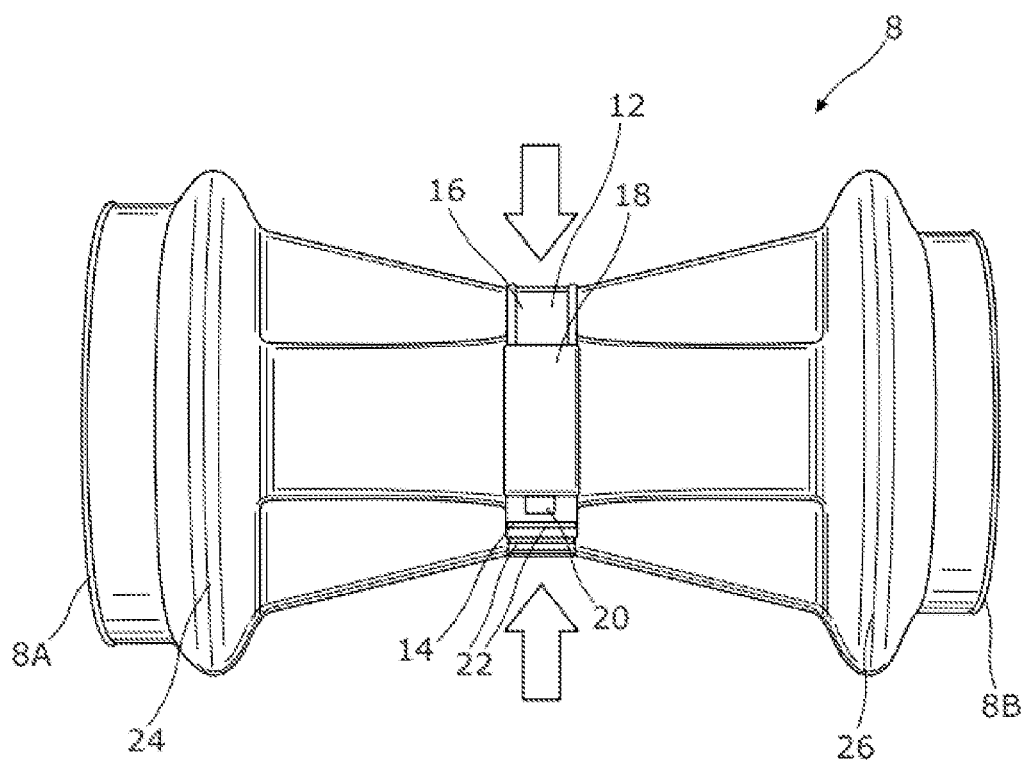
FIG. 3 is a perspective side view of the connector from FIG. 2, in the deformed state.
Figure 4:
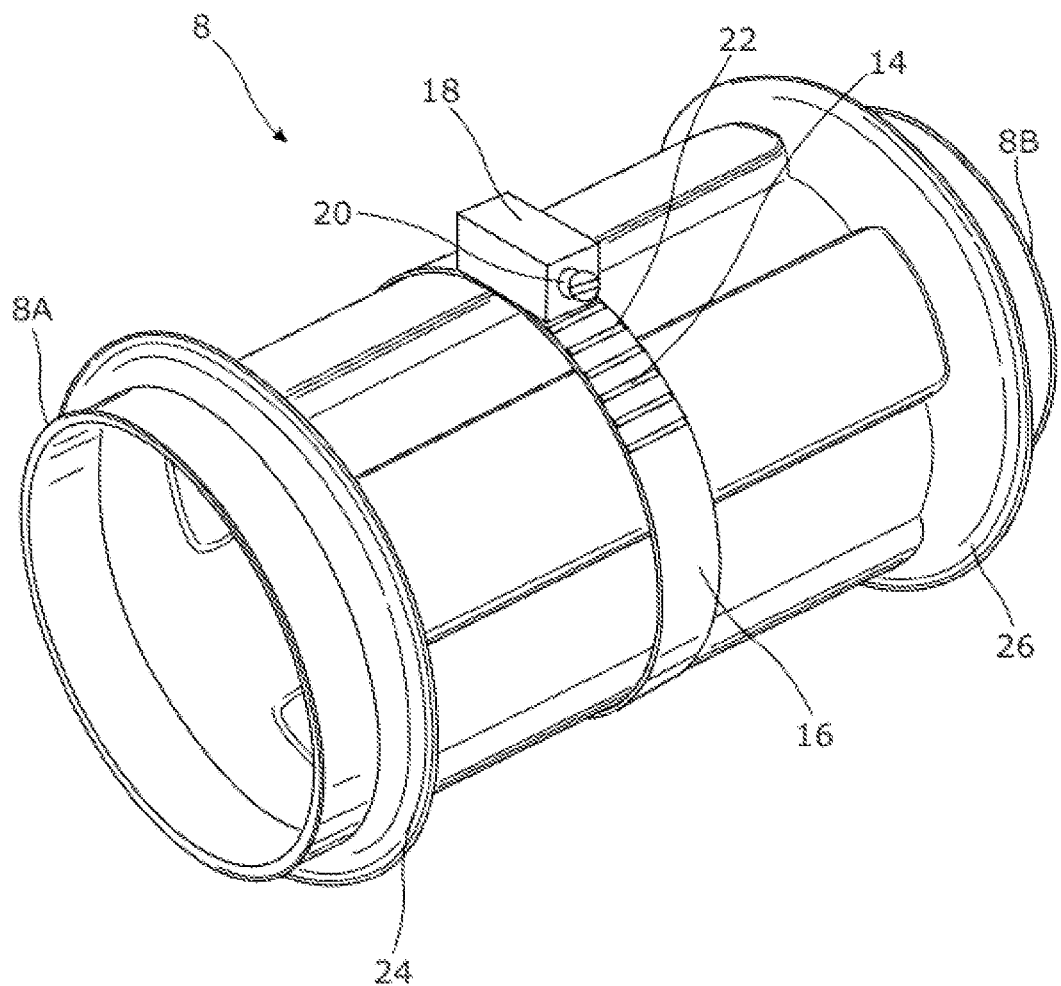
FIG. 4 is a perspective view, from another angle, of the connector from FIG. 2.

In the embodiment shown in FIGS. 1 and 2, the duct 9, when not deformed between the projections 24 and 26, is in the shape of a multi-lobed ring cylindrical duct, specifically having at least two lobes and more specifically in this case four. The duct has a succession of projecting portions separated by troughs. The projecting portions may be of any shape and may for example have a cross section with a rounded contour such as an arc of a circle or, as in FIG. 4, a semi-rectangular cross section with rounded corners. This shape allows the duct to constrict more evenly. In the embodiment shown in FIGS. 1 through 4, the cross section of the duct 9 is circular outside of the multi-lobed annular portion located between the projections 24 and 26, and the projections 24, 26 are formed by a widening then a reduction of the diameter of the duct forming the connector, resulting in a widening and a reduction of the perimeter.

When the ducts 4, 6 of a system are installed, such as those of an air-conditioning system in an aircraft, each end 8A, 8B of the connector is connected to one of the ends of each of the ducts 4, 6. FIG. 2 shows the connector 8 in the non-deformed state, specifically with a non-tightened collar. The collar is positioned between the ends connected to the ducts 4, 6. It is also positioned between the ducts. Five lines 22 are visible. As shown in FIG. 3, the collar 12 is then tightened until the desired flow rate level is reached. The marking 14 allows this flow rate level to be read directly from the band 16. In FIG. 3, more than two lines are visible. The clamping of the collar makes it possible to easily and quickly regulate the rate of flow in the ducts. Since the duct 9 is elastic, if the collar is loosened the connector returns to its initial shape and can therefore take on all possible shapes for a different flow rate adjustment, whether this requires tightening or loosening of the collar. The degree of adjustment of the flow rate can be changed as many times as desired depending on the required configuration of the system, without this requiring removal or modification of a part of the overall system, and without compromising leak tightness in the coupling of the ducts to one another or to the connector.

It is therefore no longer necessary to install a flow rate adjustment device inside the ducts of the fluidic assembly. Nor is it any longer necessary to dimension the ducts. It is quick and easy to reconfigure the air conditioning system or any system comprising a fluidic assembly of that kind.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fluidic connector to connect two fluid ducts, the fluid connector comprising at least one elastic material, and comprising:

a multi-lobed connector duct;

two shoulder-forming projections that project outwards from the connector duct on opposite axial ends of the connector duct and extend circumferentially around the connector duct, wherein the connector duct has a multi-lobed ring cylindrical shape comprising a succession of projecting portions separated by troughs that extend between the projections along a longitudinal direction of the fluidic connector; and an adjustable clamping collar encircling and surrounding the connector duct, wherein the clamping collar, when tightened, serves to deform the multi-lobed ring cylindrical shape of the connector duct to reduce an internal space of the connector duct and to change a rate of flow in the connector when it is connected to the fluid ducts.

2. The fluidic connector according to claim 1, wherein the fluidic connector is made of elastomer.

3. The fluidic connector according to claim 1, wherein the collar comprises markings that serve for estimating a degree of clamping.

4. The fluidic connector according to claim 3, wherein the markings comprise visible lines on a band of the collar.

5. The fluidic connector according to claim 1, wherein the projections are formed by a widening then a reduction of a perimeter of the connector duct.

6. The fluidic connector according to claim 1, wherein the projections form bellows to facilitate radial constriction of an interposed portion of the connector duct.

7. A fluidic assembly comprising two fluid ducts and a fluidic connector according to claim 1, wherein each end of the connector is connected to one of the ends of each of the fluid ducts, wherein clamping of the collar makes it possible to regulate the rate of flow in the fluid ducts.

8. An air conditioning system comprising a fluidic assembly according to claim 7.

9. An aircraft comprising an air conditioning system according to claim 8.

* * * * *